(12) United States Patent
Biggs

(10) Patent No.: US 12,597,309 B1
(45) Date of Patent: Apr. 7, 2026

(54) ARTIFICIAL INTELLIGENCE ASSISTED PET DOOR WITH PET RECOGNITION AND OBJECT DETECTION

(71) Applicant: Caresse L. Biggs, Pompano Beach, FL (US)

(72) Inventor: Caresse L. Biggs, Pompano Beach, FL (US)

( * ) Notice: Subject to any disclaimer, the term of this patent is extended or adjusted under 35 U.S.C. 154(b) by 0 days.

(21) Appl. No.: 19/183,497

(22) Filed: Apr. 18, 2025

(51) Int. Cl.
 *G06V 10/82* (2022.01)
 *E06B 7/32* (2006.01)
 (Continued)

(52) U.S. Cl.
 CPC ............ *G07C 9/00563* (2013.01); *E06B 7/32* (2013.01); *G06V 10/40* (2022.01); *G06V 10/774* (2022.01); *G06V 10/82* (2022.01)

(58) Field of Classification Search
 CPC ........ G08G 1/017; G08G 1/207; G08B 13/00; G08B 13/1672; G08B 13/22; G08B 21/0423; G08B 21/043; G08B 21/0492; G08B 29/186; G08B 29/188; G08B 21/22; G08B 27/005; G08B 13/19613; G08B 13/19619; G08B 13/1965; G08B 13/19695; G08B 21/18; G08B 3/10; G07C 9/00571; G07C 9/257; G07C 9/28; G07C 9/27; G07C 9/00563; G07C 9/37; G07C 2009/00507; G07C 2209/04; G07C 5/0808; G07C 9/00309; G07C 9/0069; G07C 9/00817; G07C 9/00912; G07C 9/22; G07C 9/00896; G07C 2209/02; G07C 9/00944; G07C 9/26; G07C 2209/08; G07C 2209/62; G07C 2209/65;

G07C 9/00174; G07C 9/00722; G07C 9/00904; G07C 9/253; G07C 9/32; G07C 2009/00317; G07C 2009/00769; G07C 2009/00928; G07C 2011/02; G07C 2209/63; G07C 9/00714; G07C 9/00857; G07C 9/38; G07B 15/06; G07B 15/063; G07B 15/04; G06V 40/166; G06V 40/161; G06V 40/171; G06V 40/172; G06V 10/17; G06V 10/454; G06V 10/761; G06V 10/772; G06V 10/803; G06V 10/82; G06V 10/987; G06V 40/11; G06V 40/1312; G06V 40/1347; G06V 40/1365; G06V 40/1388; G06V 40/167; G06V 40/174; G06V 40/45; G06V 40/60; G06V 40/67; G06V 40/40; G06V 10/774; G06V 10/993; G06V 40/12;
 (Continued)

(56) References Cited

U.S. PATENT DOCUMENTS

| | | | |
|---|---|---|---|
| 11,721,120 B1 * | 8/2023 | Parthe | G06V 40/60 |
| 12,299,988 B2 * | 5/2025 | Jakobsen | G06N 3/045 |
(Continued)

*Primary Examiner* — Dionne Pendleton
(74) *Attorney, Agent, or Firm* — Dunlap Bennett & Ludwig PLLC

(57) ABSTRACT

Methods, systems, and apparatus, including computer programs encoded on a computer storage medium, for a Pet Door system with Artificial Intelligence Image recognition and access-controlled pet door. The methods, systems, and apparatus include actions of obtaining content from one or more cameras, determining from the content that an authorized animal and one or more objects is present, analyzing the one or more objects for access authorization and allowing or denying access through the Pet Door system based on the access authorization.

8 Claims, 4 Drawing Sheets

(51) Int. Cl.

| | |
|---|---|
| *G06V 10/40* | (2022.01) |
| *G06V 10/774* | (2022.01) |
| *G06V 20/52* | (2022.01) |
| *G07C 9/00* | (2020.01) |

(58) Field of Classification Search

CPC ...... G06V 40/16; G06V 40/20; G06V 10/757; G06V 20/597; G06V 40/10; G06V 40/173; G06V 40/193; G06V 40/197; G06V 40/168; E05C 17/36; E05C 19/182; E05C 9/06; E05C 9/12; E05B 65/0014; E05B 47/0002; E05B 47/06; E05B 63/0065; E05B 65/0075; E05B 81/56; E05B 81/77; E05B 81/78; E05B 83/12; E05B 83/36; E05B 2047/0056; E05B 2047/0094; E05B 41/00; E05B 47/0001; E05B 65/108; G06F 18/22; G06F 18/25; G06F 18/251; G06F 21/32; G06F 21/35; G06F 21/316; G06F 2221/2133; G06F 21/31; G06F 2207/4824; G06F 7/02; G06F 7/5443; G06F 18/213; G06F 18/214; G06F 18/217; G06F 21/34; G06F 21/554; G06F 3/017; G06F 3/167; G06F 21/36; H04L 63/0861; H04L 63/102; H04L 63/0227; H04L 63/0236; H04L 63/10; H04L 63/107; H04L 63/1416; H04L 63/1466; H04L 67/12; H04L 63/104; H04L 9/3231; G06N 3/08; G06N 3/045; G06N 3/063; G06N 3/04; G06N 3/044; G06N 3/048; G06N 7/01; G06N 20/00; G06N 3/008; G06N 3/0475; G06N 3/084; H04N 23/21; H04N 7/183; H04N 7/186; H04W 12/06; H04W 12/062; H04W 12/065; H04W 12/069; H04W 12/08; H04W 4/48; H04W 4/80; H04W 8/22; H04W 4/40; H04W 4/90; Y04S 40/20; Y10T 70/7068; Y10T 70/7073; H04M 1/724098; H04M 1/72463; H04M 2250/52; G05B 19/0425; G05B 2219/40062; E06B 7/32; B66B 1/468; B66B 2201/4638; B60W 2540/043; B60W 40/08; G10L 17/00; G01S 7/4912; B64U 2101/00; B64U 2101/30; B64U 2101/60; B60G 17/017; H03K 17/945; H03K 2217/94005; E05Y 2400/66; E05Y 2900/531; E05Y 2400/852; E05Y 2201/422; E05Y 2400/446; E05Y 2400/45; E05Y 2400/452; E05Y 2400/664; E05Y 2400/85; E05Y 2400/8505; E05Y 2400/851; E05Y 2400/86; E05Y 2900/516; E05Y 2201/22; E05Y 2900/106; E05Y 2900/132; B60R 25/2045; B60R 2325/101; B60R 2325/205; B60R 25/01; B60R 25/24; B60R 25/245; B60R 25/305; B60R 25/2054; B60R 25/257; B60R 25/31; B60R 2325/106; B60R 25/04; B60R 25/2036; B60R 25/241; B60R 25/25; B60R 25/33; E05F 15/76; E05F 2015/767; E05F 15/73; E05F 2015/763; E05F 15/74; E05F 1/002; E05F 15/75

See application file for complete search history.

(56) References Cited

U.S. PATENT DOCUMENTS

| | | | |
|---|---|---|---|
| 2006/0082438 A1* | 4/2006 | Bazakos | G06V 40/166 340/10.5 |
| 2021/0324672 A1* | 10/2021 | Altiner | G07C 9/28 |
| 2024/0071157 A1* | 2/2024 | Cheng | G08B 21/043 |
| 2025/0037446 A1* | 1/2025 | Jones | G06N 3/045 |
| 2025/0315720 A1* | 10/2025 | Dande | G06N 20/00 |

* cited by examiner

ARTIFICIAL INTELLIGENCE ASSISTED PET DOOR WITH PET RECOGNITION AND OBJECT DETECTION

BACKGROUND OF THE INVENTION

Field of Endeavor

The present disclosure pertains to smart home technologies, specifically focusing on Artificial Intelligence (AI) powered pet access systems that incorporate pet recognition and object detection functionalities.

Background of Related Art

This development relates to the field of automated animal access systems, a segment of smart home technology that has steadily gained traction as homeowners seek enhanced methods of managing pet entry. In recent years, automated door mechanisms have been integrated into residential settings to facilitate secure and controlled access, driven by the desire to combine convenience with safety. Numerous solutions have been developed to grant pets a degree of freedom while attempting to safeguard interior spaces from inadvertent breaches. As technological advancements continue to permeate domestic environments, the challenge lies in refining the mechanisms that manage these access points to ensure they meet the evolving needs of households.

Systems designed for pet entry aim to provide a harmonious balance between ease of access for authorized animals and the prevention of unintended intrusions. The central objective has been to offer pet owners seamless experience(s) in permitting animal movement while maintaining the security of private spaces. These devices often incorporate methods that allow for automatic operation, seeking to diminish the need for constant manual intervention. Despite the drive toward enhanced convenience, there remains a fundamental requirement for such systems to adapt fluidly to diverse household environments and varying pet behaviors to truly satisfy the dual goals of security and ease of use.

Although there have been efforts to automate animal access, challenges continue to emerge when attempting to distinctly identify and manage a wide range of access events. Existing methodologies may confront difficulties when required to adjust to the dynamic nature of animal behavior. Variations in activity patterns, environmental changes, and unforeseen occurrences can complicate the effective regulation of entry controls. As a result, certain systems may experience limitations in reliably differentiating between everyday pet movements and potentially irregular or unintended activities, leading to a mismatch between what is desired and what is effectively controlled.

In particular, the limitations surface when established systems struggle to discern between typical pet behavior and situations that may compromise home security. Instances arise where unapproved items or unintended objects accompany the animal as the animal passes through the access point, challenging the mechanisms in place to enforce proper entry regulations. Such instances underscore the complexity of ensuring that only appropriate access events occur, while simultaneously preventing conditions that might lead to security lapses. This ongoing issue highlights the need for enhancements that can integrate more sophisticated identification and assessment techniques, thereby better aligning animal autonomy with the stringent safety requirements of modern residences.

SUMMARY OF THE INVENTION

An embodiment of the present invention provides an animal access control door system comprising at least one image capture device, at least one locking device, and at least one control unit having a processor and memory, the memory storing instructions that when executed by the processor perform a method. The method performed by the system comprises capturing one or more multimedia items by the at least one image capture device, which are provided to one or more AI Model for analysis. The one or more AI models analyze the one or more multimedia items to extract one or more features. The features are provided to the control unit to determine an authorization status for an animal. In response to the authorization status a control command is issued and then at least one locking device is controlled to allow or deny entry to the animal.

In other embodiments, a computer implemented method is provided.

DETAILED DESCRIPTION OF THE INVENTION

Figure 1:
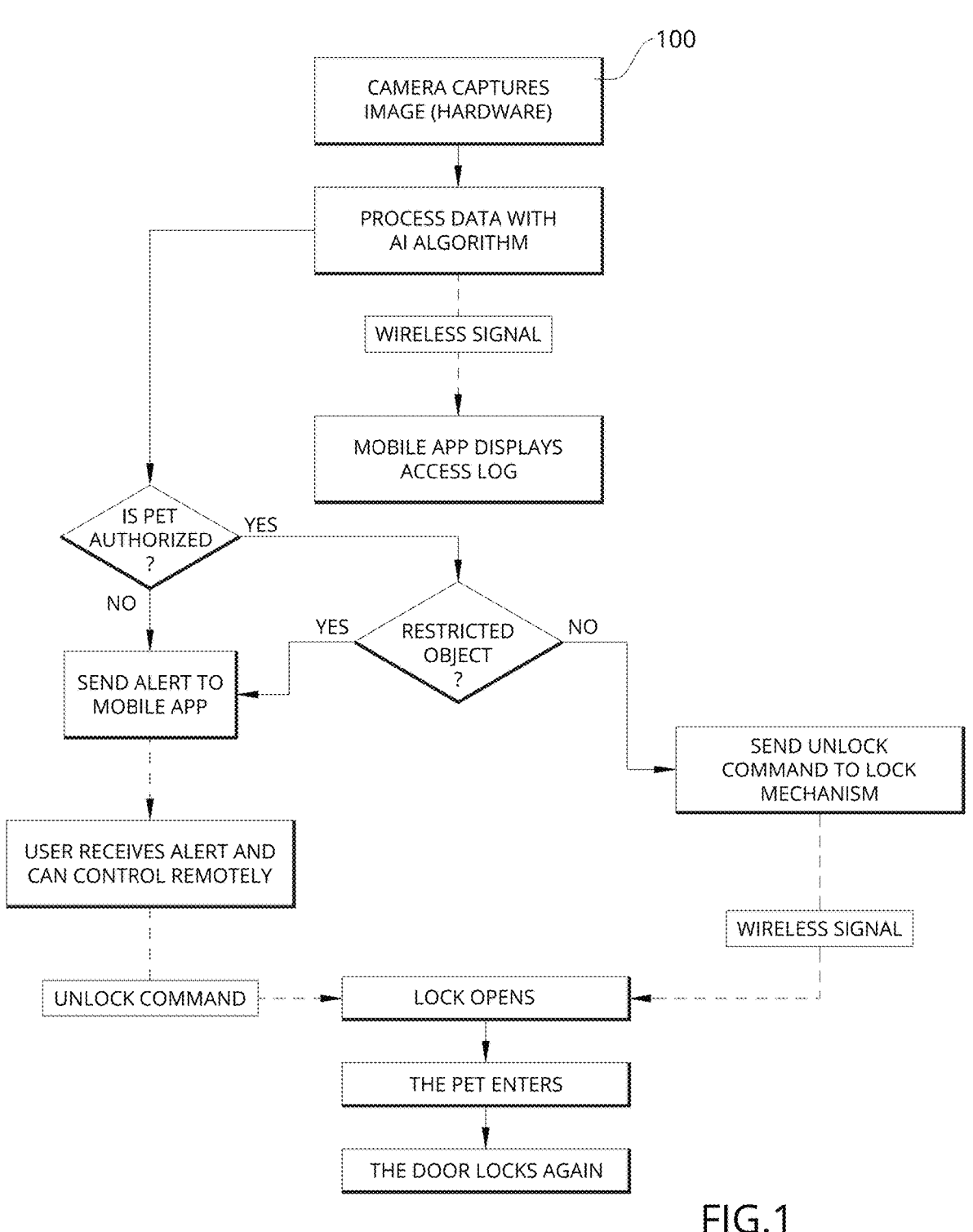
FIG. 1 is a flow chart diagram illustrating the AI-assisted pet door's decision-making process for granting or denying access.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

In the realm of smart home technologies, pet access systems have become increasingly popular as homeowners seek to balance convenience with security. Traditional pet doors, while offering ease of access for pets, often fall short in preventing unauthorized entry by other animals or objects. This presents a significant challenge for pet owners who wish to maintain the security of their homes while allowing their pets the freedom to move in and out as they please. The need for a more sophisticated solution is evident, as current systems struggle to adapt to the dynamic nature of pet behavior and environmental changes.

Existing automated pet door systems typically rely on RFID tags or similar technologies to grant access. However, these systems have notable limitations. RFID-based solutions require pets to wear tags, which can be lost or damaged, and they do not prevent unauthorized animals from entering if they manage to follow a tagged pet. Additionally, these systems lack the capability to detect objects that pets may carry in their mouths, such as prey or debris, and/or when a pet is in a soiled state, which can lead to unwanted messes or security breaches within the home. The inability to differentiate between authorized and unauthorized access events remains a significant shortcoming of current technologies.

The current solution addresses these challenges by introducing an AI-assisted pet door system that incorporates advanced pet recognition and object detection capabilities. This system utilizes artificial intelligence to identify permitted animals based on one or more features such as, facial recognition, markings, objects, etc., removing the need for RFID tags and enhancing security by ensuring that only recognized pets can gain entry. Additionally, the system is equipped with object detection technology to identify and restrict access when pets attempt to bring in unauthorized items, and/or when a pet is in a state that is unsatisfactory to the owner, such as muddy, wet, or otherwise soiled. This approach not only enhances the security of the home but also provides pet owners with greater control over what their pets can bring inside, thereby addressing existing limitations and offering a more comprehensive solution for modern households.

Broadly the AI-assisted pet door system of the present invention can include a plurality of components, such as at least one user device and at least one smart pet door configured to provide functionalities associated with the AI-assisted pet door system of the present invention. In embodiments, the at least one user device and the at least one smart pet door are communicatively coupled via one or more networks. Optionally, the AI-assisted pet door system of the present invention can include one or more servers, and/or cloud processing/storage devices to process and/or store data for the system.

The smart pet door includes a plurality of components and is configured to analyze, using one or more AI models, environmental data to determine access controls for one or more animals attempting to enter through the at least one smart door. The plurality of components include, but are not limited to: a control unit, such as a data processing apparatus, computer, microprocessor, microcontroller, or other computing device; optionally, at least one AI processing unit, such as such as an NVIDIA Jetson Nano or Jetson Orin module, configured to perform model inference; a locking device, such as an electronic solenoid lock, magnetic lock, or motorized lock, for secure locking and unlocking in response to one or more commands from the control unit; at least one image capture device, such as a still image camera, video camera, infrared camera, night vision camera, etc., configured to capture environmental information; at least one microphone configured to capture audio information; a door; a frame or housing configured to house the plurality of components; one or more power sources; optionally, one or more actuators, such as motors, configured to move the door from an open to close position or vice versa; and optionally, one or more additional sensors, such as a proximity sensor, motion sensor, etc., configured to capture environmental information.

The control unit of the smart pet door is configured to receive data regarding its environment, such as still images, video, audio, proximity data, motion data, multimedia content, other sensor data, etc., analyze the data to determine an authorization status, and control components of the smart pet door based on the authorization status. Additionally, the control unit can transmit data to the at least one user device, and/or one or more additional computing devices, through one or more communicative couplings provided thereto.

The control unit, or alternatively the AI processing unit, is configured to analyze received environmental data using one or more AI models. In embodiments, the one or more AI models are configured as convolutional neural networks (CNNs), such as ResNet or MobileNetV2, trained to perform pet identification based on features including facial structure, breed, markings, and other distinctive characteristics. For object detection, models such as YOLOv8 or EfficientNet may be employed to identify restricted items— e.g., trash, prey, feces, or debris—being carried by the animal. These models are trained using supervised learning methods on datasets containing labeled images of animals and objects, including both real-world imagery and synthetic data generated in simulation environments such as Unity Perception to cover a wide range of lighting and environmental conditions. Model inference is performed in real-time using the control unit, or alternatively a dedicated AI processing unit, such as an edge AI processor such as an NVIDIA Jetson Nano or Jetson Orin module. In embodiments, the one or more AI models can be updated periodically through over-the-air firmware updates.

In embodiments, the one or more AI models are configured to extract one or more features from the received environmental data which are used to determine authorization status, i.e. performing Model Inference. In embodiments, the one or more features can include animal features, such as facial recognition, animal breed, animal markings, animal face shape, and object features, such as trash, feces, toys, prey items, mud, dirt, dust, sticks, or other debris.

Additionally, the control unit can execute one or more software programs, applications, modules, etc., configured to manage, control, or otherwise interact with the AI-assisted pet door system. Briefly, the one or more software programs can include functionality configured for object detection settings, pet profile management, access histories, lock device control, notifications and alerts, and/or general settings.

In embodiments, functionality to manage object detection settings by adding/modifying/updating a list of authorized and/or unauthorized objects, adding one or more custom objects, and/or adjusting a tolerance for debris, such as dirt, mud, dust, or wet fur.

In embodiments, functionality to manage a profile for one or more animals, such as pets, can include: adding one or more pet profiles, including identifying information for a pet, such as a name, breed, one or more images of the pet, and one or more authorization status(es); view one or more authorized pets; and/or add/remove one or more pet(s) or pet profiles from the system.

In embodiments, functionality related to system access, such as, one or more access histories of one or more pets to the smart pet door, which can include information such as a date, a time, and a pet name associated with each entry/exit from the smart pet door, and/or one or more alerts/logs of attempted unauthorized access by one or more animals. The one or more alerts can be push notifications related to any event of the AI-assisted pet door system.

In embodiments, functionality related to general settings includes firmware/software updates configured to allow the AI-assisted pet door system to be updated over-the-air, or by other known technologies. Additionally, one or more functions for management, editing or otherwise interacting with user profiles can be provided, such as account management, password management, and/or privacy settings management.

The user device such as a computer, data processing apparatus, mobile computing device, smart phone, laptop, etc., is configured to receive and transmit information, commands, alerts, etc., from/to the smart pet door, and to provide an interface for a user to manage and/or control one or more aspects of the AI-Assisted pet door system. The user device can execute one or more software programs, applications, modules, etc., configured to manage, control, or otherwise interact with the AI-assisted pet door system. Briefly, the one or more software programs can include functionality configured for object detection, pet profile, access histories, lock device control, and/or general settings.

In embodiments, functionality related to object detection allows a user to view/edit/modify a list of objects that are authorized/unauthorized by the system, and/or adjust one or more tolerances related to a condition, such as dirtiness, level of wetness, muddiness, etc. Functionality related to pet profiles allows a user to view/add/modify one or more pet profiles including information such as such as a name, breed, one or more images of the pet, and one or more authorization status(es). Functionality related to access histories allow a user to view an access history log associated with the smart pet door, including information such as one or more images, a date of access, a time of access, and/or an event time, i.e. entry, exit, denial. Functionality related to general settings include software update functionality configured to update the one or more software programs; one or more notifications settings; and/or one or more lock/unlock settings.

Figure 2:
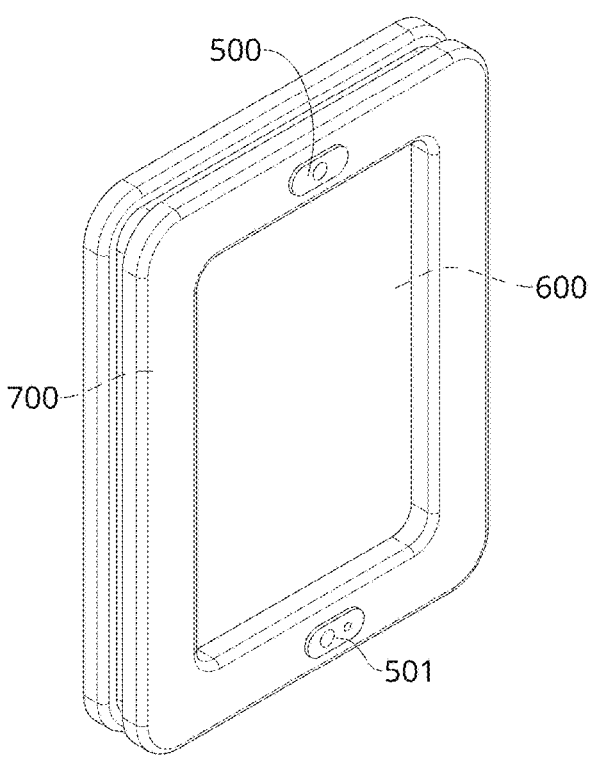
FIG. 2 is a front perspective view illustrating the AI-powered pet door with integrated pet recognition and object detection features.
Figure 3:
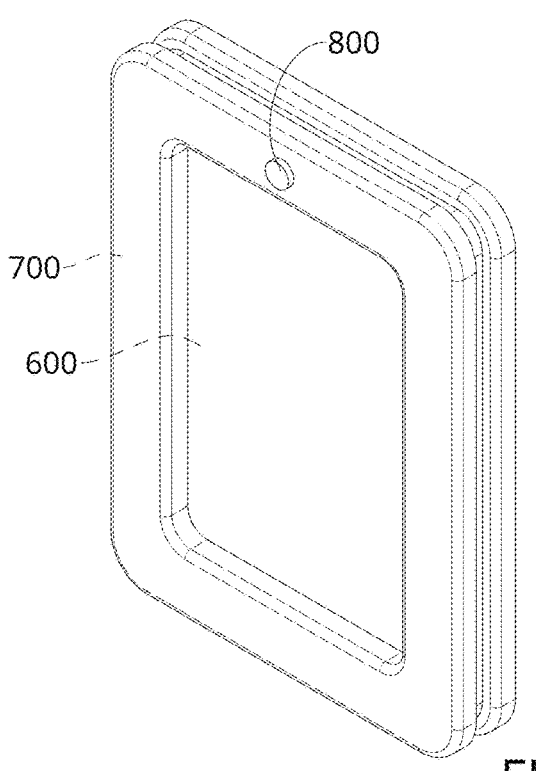
FIG. 3 is a rear perspective view illustrating the AI-powered pet door with integrated pet recognition and object detection features.
Figure 4:
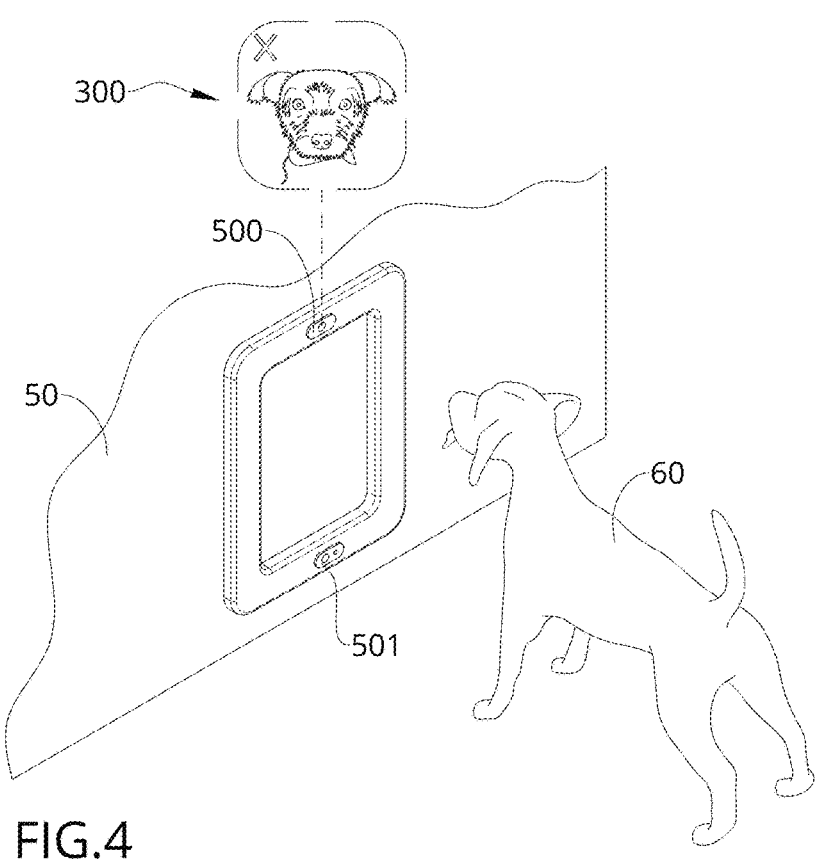
FIG. 4 illustrates a perspective view of the AI-assisted pet door system with a camera and sensor for pet recognition, with security door closed.
Figure 5:
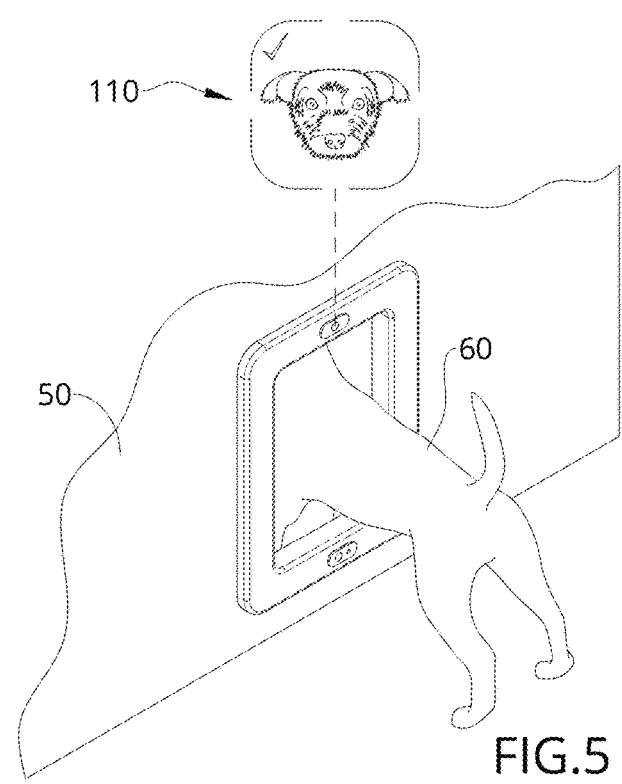
FIG. 5 illustrates a perspective view of the AI-assisted pet door system with a camera and sensor for pet recognition, with security door open.
Figure 6:
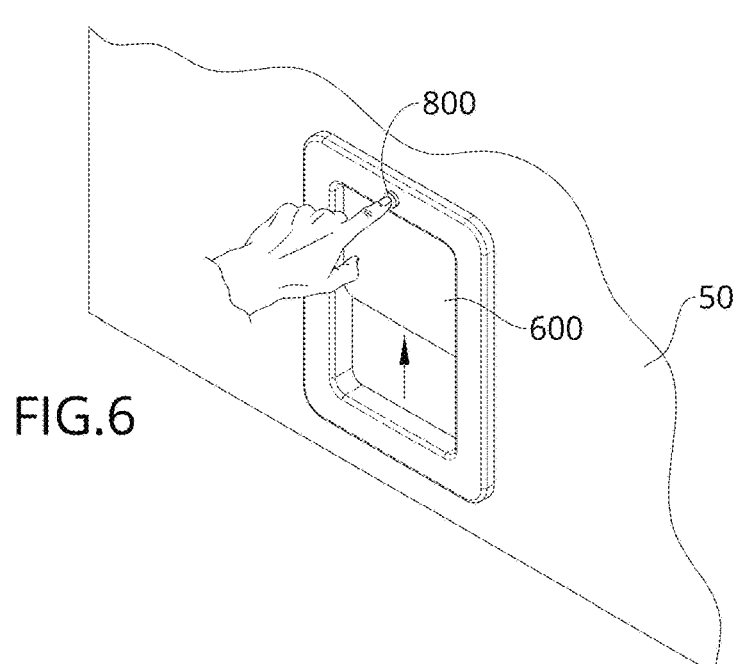
FIG. 6 illustrates a perspective view of the AI-assisted pet door system in operation, highlighting user actuation features.

Referring now to FIG. 2-3, aspects of the pet door are illustrated. In embodiments, pet door can have a housing, or frame, 700 for housing the components of the pet door. In embodiments, the frame 700 has one or more environmentally protective attributes, such as weatherproofing. The Pet door is installed on a structure 500, such as a door, or wall, as illustrated in FIGS. 4-6, and permits/denies access based on an authorization status. In embodiments, components housed in the frame 700 include: the control unit, optionally, the AI processing unit, the locking device, the at least one camera 500, the at least one microphone, the one or more power sources; optionally, the one or more actuators, and optionally, the one or more additional sensors 501.

In embodiments the locking device is installed within the frame 700 of the pet door and can be actuated automatically, or manually, as described further hereinafter, to prevent/allow access through door 600. Additionally, the one or more actuators can be coupled, directly or, indirectly through one or more gearing systems, to control movement of door 600.

Referring now to FIGS. 1 and 4-7, aspects of a method 100 of operating the AI-assisted pet door system of the present invention are illustrated. Method 100 begins with one or more cameras of pet door capturing one or more images. In embodiments, the one or more images are captured by camera 500 in response to an object being present, and/or meeting a threshold associated with additional sensor(s) 501, as illustrated in FIG. 4. In embodiments, additional sensor(s) 501 can be a motion sensor and the threshold is a detected motion, alternatively additional sensor(s) 501 can be a proximity sensor and the threshold is a distance threshold.

The one or more images are provided to one or more AI models for processing and analysis. In embodiments, the one or more AI models are resident on the control unit, or alternatively the AI processing unit, of the pet door and the one or more images are processed and analyzed thereon. The one or more AI models process the one or more images to determine one or more features present, and in response to the one or more features to issue a control command to the locking device of pet door. In embodiments, the one or more features can include animal features, object features, and/or condition features. In embodiments, the animal features include, but are not limited to an animal's facial features, a breed of the animal, one or more markings of the animal, or a face shape of the animal. In embodiments, the object features include, but are not limited to, one or more items designated as prohibited by a user of the system, such as unwanted items in an animal's mouth, trash, feces, toys, or other animals/prey. In embodiments, the one or more condition features include a debris level of an animal such as mud, dirt, dust, and/or water/wetness.

The one or more AI models utilized in this system may include deep convolutional neural networks trained for facial recognition and object classification tasks. Specifically, models such as MobileNetV2 or ResNet can be used to perform facial identification of authorized pets, while object detection models such as YOLOv8 or EfficientNet can analyze the multimedia input to identify unauthorized objects (e.g., sticks, toys, trash, or other animals) and assess the condition of the pet (e.g., muddy, wet). Training data includes both captured and simulated multimedia content to ensure robust performance across environmental variables. As stated previously, Model Inference is performed either on the control unit, or on the AI processing unit, such as a hardware-accelerated edge processor, allowing decisions to be rendered in real time. In embodiments, the one or AI models can include separate models for each animal features, object features, and/or condition features, and/or the one or more AI models can combine one or more of the features into a singular model. In embodiments, the one or more AI models work collectively to determine the animal's authorization status and trigger the appropriate locking or alert actions based on the detected conditions.

The animal features, object features, and/or condition features are utilized alone, or in combination, by the control unit of the pet door to determine if an animal is authorized access via pet door. In embodiments, a user can authorize one or more pets, and/or blacklist one or more objects or animals by accessing the application running the user device and providing one or more images that identify one or more authorized pets, blacklisted objects, or blacklisted animals. In embodiments, the one or more images of authorized pets, authorized objects, blacklisted objects, and/or blacklisted animals are utilized by the one or more AI models for identification.

If the one or more AI models identifies an authorized pet 60 with no restricted objects, the control unit sends a command to the locking device to unlock, causing the locking device to unlock, and optionally, actuating one or more motors to open door 600. Once unlocked, the authorized pet 60 can enter with door 600 locking once pet 60 has fully passed through door 600, as illustrated in FIG. 5.

If the one or more AI models identifies an authorized pet 60 with one or more restricted objects, the control unit denies, i.e. does not command the locking device to unlock, entry to pet 60 and sends an alert to the at least one user device. In response to the alert, the user can determine to manually override the denial by utilizing the user device to send an unlock command to the control unit of pet door 700. In response to the manual override the control unit of pet door 700 sends a command to the locking device to unlock, causing the locking device to unlock, and optionally, actuating one or more motors to open door 600. Once unlocked, the authorized pet 60 can enter with door 600 locking once pet 60 has fully passed through door 600, as illustrated in FIG. 5. If the user determines not to manually override the denial, pet door 700 remains locked until no restricted objects are present in the one or more images, at which time pet 60 can be re-evaluated for authorization.

If the one or more AI models identifies an unauthorized pet, i.e. the absence of an authorized pet in the one or more images and/or the presence of at least one pet that is not authorized, the control unit denies, i.e. does not command the locking device to unlock, entry to pet 60 and sends an alert to the at least one user device, as illustrated in FIG. 4. In response to the alert, the user can determine to manually override the denial by utilizing the user device to send an unlock command to the control unit of the pet door. In response to the manual override the control unit of the pet door sends a command to the locking device to unlock, causing the locking device to unlock, and optionally, actuating one or more motors to open door 600. Once unlocked, the authorized pet 60 can enter with door 600 locking once pet 60 has fully passed through door 600, as illustrated in FIG. 5. If the user determines not to manually override the denial, the pet door remains locked until an authorized pet 60 is present in the one or more images, at which time pet 60 can be re-evaluated for authorization.

Figure 7:
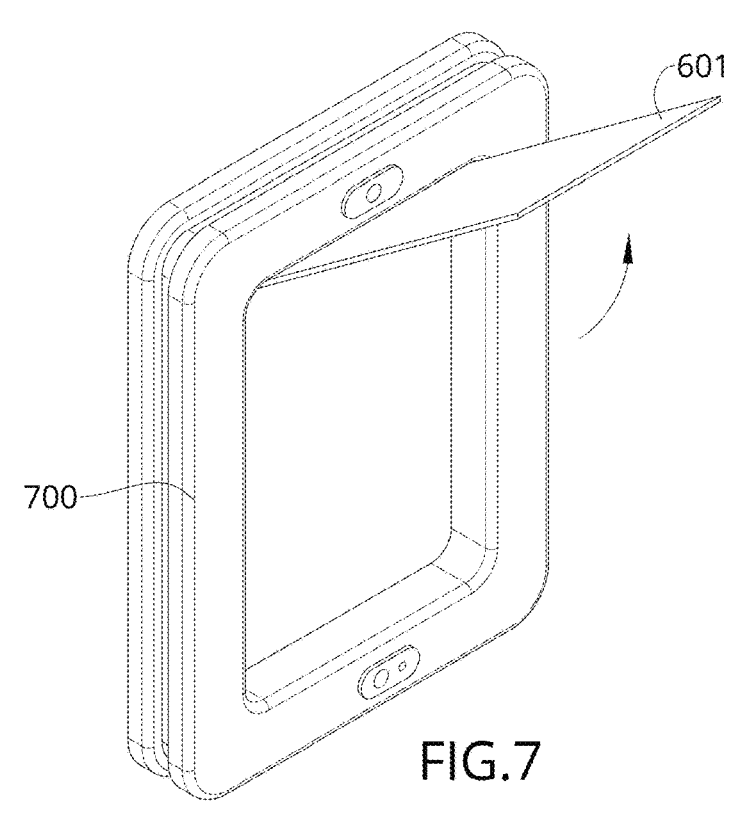
FIG. 7 illustrates a perspective view of the AI-assisted pet door system in operation, highlighting user actuation features.

Referring now to FIG. 7, an alternative door 601 of the pet door is illustrated. The Pet door in an embodiment can have a manually actuated door which, once unlocked, can be forced open by pet 60 for entry/exit from a structure. Alternatively, the one or more actuators, such as motors can be provided that, when commanded by the at least one computing device, cause a sliding door 600, as illustrated in FIG. 6, to open/close based on the command. Alternatively, one or more actuators, such as motors can be provided that, when commanded by the at least one computing device, cause a swinging door 601, as illustrated in FIG. 7, to swing open/close based on the command.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a non-transitory machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer or AI processing system. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Generally, a computer will also include a communications device. The communication device can include hardware and/or software for generating and communicating signals over a direct and/or indirect network communication link. As used herein, a direct link can include a link between two devices where information is communicated from one device to the other without passing through an intermediary. For example, the direct link can include a Bluetooth™ connection, a Zigbee connection, a Wifi Direct™ connection, a near-field communications ("NFC") connection, an infrared connection, a wired universal serial bus ("USB") connection, an ethernet cable connection, a fiber-optic connection, a firewire connection, a microwire connection, and so forth. In another example, the direct link can include a cable on a bus network. An indirect link can include a link between two or more devices where data can pass through an intermediary, such as a router, before being received by an intended recipient of the data. For example, the indirect link can include a WiFi connection where data is passed through a WiFi router, a cellular network connection where data is passed through a cellular network router, a wired network connection where devices are interconnected through hubs and/or routers, and so forth. The cellular network connection can be implemented according to one or more cellular network standards, including the global system for mobile communications ("GSM") standard, a code division multiple access ("CDMA") standard such as the universal mobile telecommunications standard, an orthogonal frequency division multiple access ("OFDMA") standard such as the long term evolution ("LTE") standard, and so forth.

Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

It should be understood, of course, that the foregoing relates to exemplary embodiments of the invention and that modifications may be made without departing from the spirit and scope of the invention as set forth in the following claims.

What is claimed is:

1. An animal access control door system, comprising:
at least one door;
at least one image capture device;
at least one locking device;
at least one control unit having a processor and memory, the memory storing instructions that when executed by the processor perform a method, the method comprising:
capturing, by the at least one image capture device, one or more multimedia items;
analyzing, using a plurality of Artificial Intelligence (AI) Models, the one or more multimedia items to extract one or more features;
determining, by the plurality of AI Models using the one or more features, an authorization status for an animal;
issuing at least one command based on the authorization status; and
controlling, the at least one locking device, using the at least one command, wherein the plurality of AI models further comprise:
a first convolutional neural network configured to detect one or more identifying features of the animal, wherein the one or more identifying features is one or more of: one or more facial features, an animal breed, or one or more animal markings;
a second convolutional neural network configured to detect one or more prohibited objects;
a third convolutional neural network to detect one or more allowed objects; and
a fourth convolutional neural network configured to detect one or more conditions of the animal, wherein the one or more conditions include at least a level of debris on the animal.

2. The animal access control door of system of claim 1, further comprising:
at least one actuator coupled to the at least one door;
controlling, the at least one actuator, using the at least one command.

3. The animal access control door system of claim 1, wherein a first convolutional neural network, the second convolutional neural network, the third convolutional neural network, and the fourth convolutional neural network are trained using one or more supervised learning methods, wherein the one or more supervised learning methods utilize one or more datasets containing labeled images of animals or objects.

4. The animal access control door system of claim 3, wherein the one or more datasets include at least one of: real-world multi-media content, or synthetic multimedia content.

5. A computer implemented method for animal access control, comprising:

receiving one or more multimedia content items;

analyzing, using a plurality of Artificial Intelligence Models, the one or more multimedia content items to extract one or more features;

determining, by the plurality of Artificial Intelligence Models using the one or more features, an authorization status for an animal;

issuing at least one command based on the authorization status; and controlling at least one locking device using the at least one command, wherein the plurality of AI models further comprise:

a first convolutional neural network configured to detect one or more identifying features of the animal, wherein the one or more identifying features is one or more of: one or more facial features, an animal breed, or one or more animal markings;

a second convolutional neural network configured to detect one or more prohibited objects;

a third convolutional neural network to detect one or more allowed objects; and a fourth convolutional neural network configured to detect one or more conditions of the animal, wherein the one or more conditions include at least a level of debris on the animal.

6. The computer implemented method of claim 5, further comprising:

controlling at least one actuator using the at least one command.

7. The computer implemented method of claim 5, further comprising: training the first convolutional neural network, the second convolutional neural network, the third convolutional neural network, and the fourth convolutional using one or more supervised learning methods, wherein the one or more supervised learning methods utilize one or more datasets containing labeled images of animals or objects.

8. The computer implemented method of claim 7, wherein the one or more datasets include at least one of: real-world multi-media content, or synthetic multimedia content.

* * * * *